United States Patent [19]
Wheeler

[11] Patent Number: 4,884,523
[45] Date of Patent: * Dec. 5, 1989

[54] VEHICLE WARNING SYSTEM

[76] Inventor: Basil W. Wheeler, 1207 N. Hine St., Athens, Ala. 35611

[*] Notice: The portion of the term of this patent subsequent to Jan. 12, 2005 has been disclaimed.

[21] Appl. No.: 142,915

[22] Filed: Jan. 12, 1988

Related U.S. Application Data

[63] Continuation-in-part of Ser. No. 837,011, Mar. 6, 1986, Pat. No. 4,718,372.

[51] Int. Cl.$^4$ .................. G08B 7/06; G10K 11/00
[52] U.S. Cl. .......................... 116/3; 181/155; 181/198
[58] Field of Search ............ 116/3, 4, 137 R; 181/141, 143, 155, 198, 179; 340/384 R, 88

[56] References Cited

U.S. PATENT DOCUMENTS

| | | | |
|---|---|---|---|
| 1,134,360 | 4/1915 | Walker | 116/3 |
| 1,290,728 | 1/1919 | Fanger | 116/137 R |
| 1,653,119 | 12/1927 | Perrin | 116/137 R |
| 2,166,821 | 7/1939 | Nielsen | 116/137 R |
| 3,735,041 | 5/1973 | Fujita et al. | 181/153 V |
| 4,056,165 | 11/1977 | Okamoto et al. | 181/141 |
| 4,116,302 | 9/1978 | Seebinger | 116/142 R |
| 4,189,709 | 2/1980 | Gosswiller | 340/384 X |
| 4,310,833 | 1/1982 | Sakaguchi | 340/384 E |
| 4,365,113 | 12/1982 | Soma et al. | 181/144 |
| 4,365,114 | 12/1982 | Soma | 181/144 X |
| 4,433,750 | 2/1984 | Neese | 181/179 |
| 4,635,039 | 1/1987 | Gosswiller | 340/384 E |
| 4,689,609 | 8/1987 | Ko | 181/143 X |
| 4,733,748 | 3/1986 | Ponticelli, Jr. | 181/141 |

Primary Examiner—Daniel M. Yasich
Attorney, Agent, or Firm—George J. Porter

[57] ABSTRACT

A vehicle warning system (1) is disclosed. The device includes a main housing (2) to which is attached a sound generator (7), a lighting system (5), a mounting bracket (4) which is used to attach the device to an emergency vehicle, and a trim ring (6) which conceals the mounting means of the device. As a sound signal is produced by the generator (7) it passes through a nozzle (9) and an aperture (14) into a deflector means (3) which is designed to expand and direct the sound signal through carefully proportioned chambers (30) and (33) of the deflector (3) so as to direct the sound signal against the closed portion (15) of expander horn (16) and out the open portion of the expander horn (16). In operation the sound generating system is attached to an amplifier of well known design and is capable of producing a variety of sound signals.

21 Claims, 6 Drawing Sheets

VEHICLE WARNING SYSTEM

CROSS REFERENCE TO RELATED APPLICATION

This application is a continuation-in-part of prior U.S. patent application Ser. No. 06/837,011, filed March 6, 1986 now U.S. Pat. No. 4,718,372, issued January 12, 1988.

TECHNICAL FIELD

The present invention relates to a vehicle warning system and more particularly to a warning system which is adapted to be attached in the grill or bumper area of an emergency vehicle.

BACKGROUND OF THE INVENTION

As is well known, conventional emergency vehicles include noise making and lighting systems intended to warn persons in the area of their approach. Typically such emergency vehicles have sirens and lighting systems mounted on the top, the hood or the fenders. Heretofore mounting of warning systems in such locations on the vehicle has been necessitated by the size and configuration of available warning systems. However such locations produce many undesirable effects. For example, a typical siren mounted on top the vehicle, its hood or fenders produces a great deal of noise within the vehicle. If mounted on the hood of conventional type vehicles, engine heat greatly diminishes the longevity of the device. Further it has been shown by extensive testing that the higher the device is located from the ground plane, the less effective is its ability to transmit the generated sound over a satisfactory distance so as to warn of the approach of the vehicle. Heretofore vehicle warning systems were not designed to be mounted in a location which is suitable for increasing the sound level ahead of the vehicle while at the same time decreasing the level within the vehicle. Some prior art systems utilized a large megaphone type horn to direct the sound signal. This type device permits the signal to be expanded and directed as it passes through the lengthy horn portion of the megaphone. The present invention provides the necessary direction and expansion of a noise signal over the appropriate distance by use of a system only a fraction of the length of a typical megaphone type system. Thus by virtue of the present system's unique design, the length of travel of the sound signals within the device is sufficient to allow complete expansion and direction of the signal and yet provide a system which is compact enough to be mounted in the grill or lower forward portion of an emergency vehicle. Further, existing devices do not contemplate the dual function of a sound and lighting system which may be mounted in the grill or lower forward portion of an emergency vehicle and which does not inhibit vital vehicle functions such as its cooling. The deficiencies in existing systems are pointed out by the fact that recent government specifications have been published to define a satisfactory warning system. These specifications require a high level sound carrying capability on the outside of the vehicle and at the same time require a decrease in the noise level within the vehicle.

Therefore it is an object of this invention to provide an emergency vehicle warning system which overcomes the shortcomings of existing warning systems.

It is a further object of this invention to provide a vehicle warning system which, while being very compact, permits the appropriate travel of sound signals over the required distance and direction so as to achieve maximum signal output.

Another object of this invention to provide a warning system which may be quickly and easily mounted in the grill or bumper area of modern vehicles without affecting vital operations of the vehicle.

Yet another object of this invention to provide a warning system which includes both sound and visual warning means in a compact device.

Still another object of this invention to provide a compact audio visual warning system which may be mounted in the front of a vehicle by conventional means and which requires no extensive modifications for its mounting.

It is another object of this invention to provide a system which is attractive and which includes a trim ring which totally conceals all mounting portions of the system and is easily and quickly mountable and removeable.

A further object of this invention is to provide a system which is suitable for mounting on the lower forward portion of an emergency vehicle whereby it may direct sound signals in close proximity to ground level at a very high level and which produces a minimum of noise within the vehicle itself.

It is another object of this invention to provide a device which, while compact, is designed to cause the generated sound signals to move within the system a sufficient and calculated distance whereby the expansion and direction of the signals are carefully controlled to achieve maximum efficiency and the highest possible audio levels.

SUMMARY OF THE INVENTION

The present invention is a vehicle warning system which is specifically designed to be located in the confines of the grill area of a modern vehicle wherein space is very limited. In such a location the device may be positioned in close proximity to the ground thus utilizing the reflection of sound signals as they strike the ground forward of the vehicle to enhance the effectiveness of the signal. Thus, the device as presented is capable of meeting or exceeding modern sound level requirements for warning systems, by use of a unique system for directing and expanding the noise signal, while occupying only a small portion of the area needed to mount existing warning systems.

The device also encompass a lighting portion which operates in conjunction with the noise generation portion of the device.

DETAILED DESCRIPTION OF THE INVENTION

Figure 1:
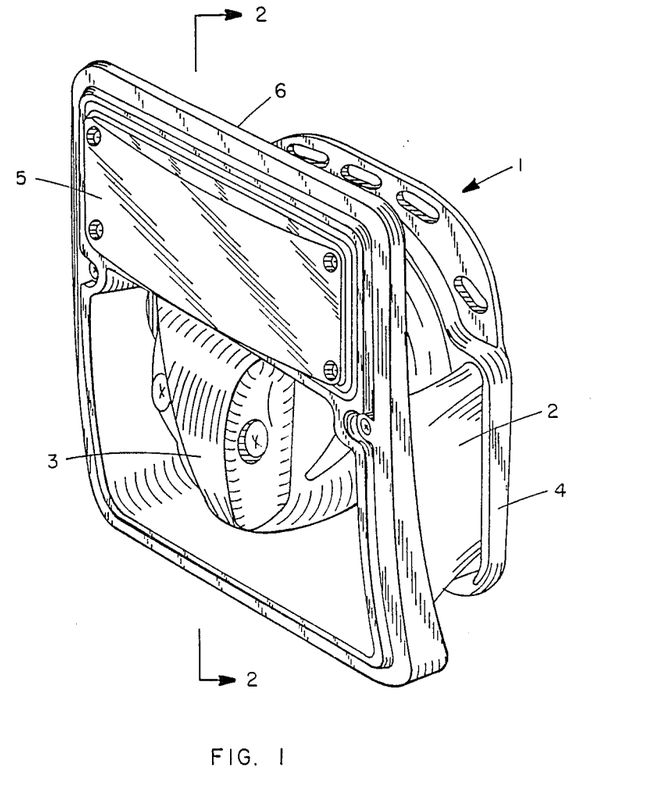
FIG. 1 is a perspective view of the present invention showing its general configuration.

FIG. 1 discloses a vehicle warning system 1 which in general includes a main housing 2, a noise deflector 3, a mounting base 4, a light 5, and a trim ring 6.

Figure 2:
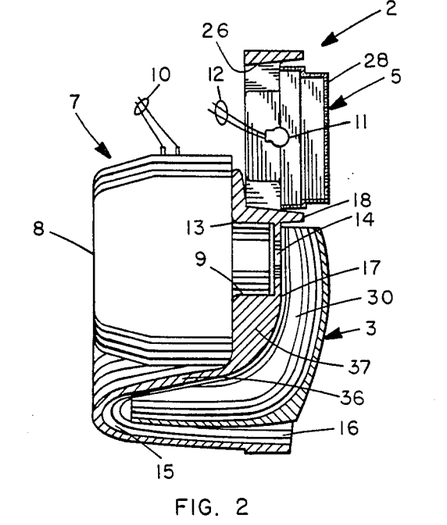
FIG. 2 is a partial sectional view taken along 2—2 of FIG. 1.

As is best illustrated in the sectional view of FIG. 2 the main housing 2 is formed to receive three principal elements, a sound generator 7, a light assembly 5 and a deflector 3. The sound generator 7 comprises a driver portion 8 and a nozzle portion 9, from which the sound signal from driver portion 8 is emitted. The driver receives electrical signals through input leads 10 which are connected to a conventional amplifier and control head and which supply the electrical signals. The driver 8 in turn converts the electrical signals to sound signals. These signals may take numerous forms such as a public address transmission, the sound of a siren, a yelp, an airhorn, a wail, or a two tone signal such as is common in European emergency vehicles. Thus the driver is in effect a high efficiency speaker which generates a variety of sound signals as needed for emergency vehicle application. It will also be noted from FIG. 2 that the main housing 2 comprises an upper portion which serves as a receptacle for light 5. This light consists of a lens 28, and a bulb and socket arrangement 11. The light is connected by wires 12 to conventional switching or strobe control means to operate the light in the manner desired. It is further noted in FIG. 2 that the nozzle 9 of the sound generator 7 is located within nozzle receiver 13 which also includes at its forward portion an aperture 14 through which the generator sound signals must pass. The deflector 3 is attached to the closed end portion 15 of a primary expander horn 16 and is sealed along the upper closed end of the expander horn by seal 17. The primary expander horn 16 is rectangular in shape and the nozzle receiver aperture 14 is located adjacent the upper long side 18 of the primary expander horn 16. This long side of the primary expander horn 16 also makes up the lower portion of the rectangular shaped light receptacle 26 which receives the light 5. This receptacle 26 is an integral part of the main housing 2.

Figure 3:
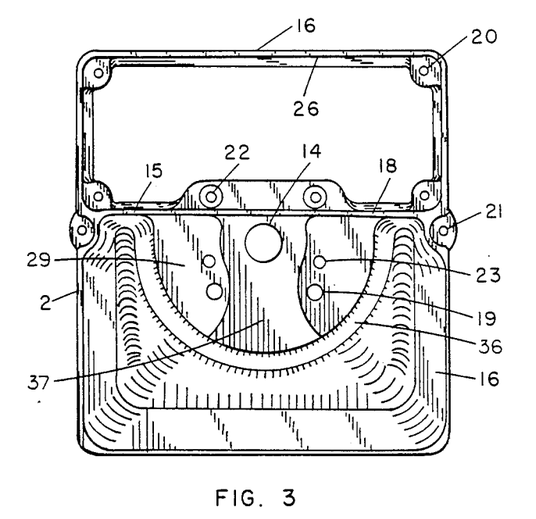
FIG. 3 is a front view of the main housing of the invention with all other elements removed for illustration of the details of construction of the housing.

FIG. 3, which shows a front view of the main housing 2 with the deflector 3 and light 5 removed, best illustrates the arrangement of the various means for attaching these components to the housing. The deflector 3 for example, is held in place by screws which are adapted to pass through the holes 19 for engagement in tapped holes formed in the forward portion of sound generator 7. The holes 20 are threaded and are adapted for reception of screws for retaining the light mechanism in the light receptacle 26. Holes 21 are threaded to receive screws for retaining the trim ring 6. The sound generator 7 is held in place by screws which pass through holes 22 and into threaded holes within the generator and be screws which pass through the deflector 3 and holes 19 of the main housing 2 and are threaded into the generator 7.

Figure 4:
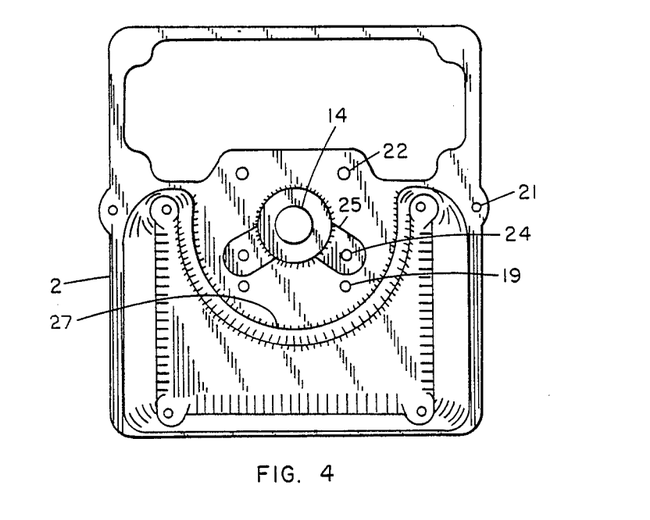
FIG. 4 is a rear view of the main housing of the device with all other elements removed for illustration of the details of construction of the housing.

FIG. 4 is a rear view of housing 2 with all parts removed, showing the configuration of the housing and the relative location of the housing holes as illustrated in FIG. 2 except for the threaded holes 20 which do not pass completely through housing 2. Also illustrated on either side of aperture 14 are relieved and flattened portions 25 which provide a suitable mounting surface for the sound generator 7. The lower portion of the rear side of main housing 2 has a semicircular indentation 27 which is closed on its bottom side and open on its upper side. This indentation 27 in the rear side of main housing 2 encloses the lower half of the driver portion 8 sound generator 7, so that main housing 2 and sound generator 7 fit together to make a compact package.

Figure 5:
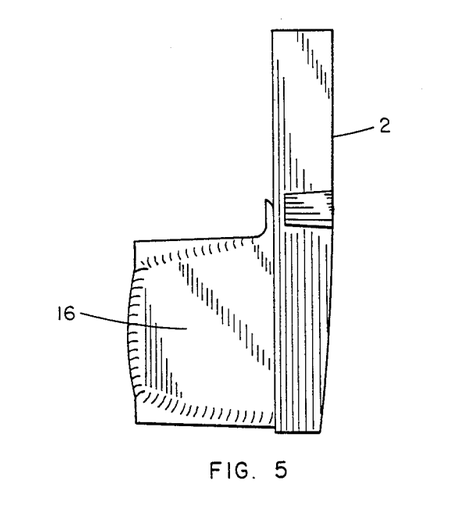
FIG. 5 is a side view of the main housing of the invention with all other elements removed for illustration of the details of construction of the housing.

FIG. 5 is a side view of the housing 2 which illustrates the configuration of the main housing 2 and in particular the configuration and depth of the primary expander horn 16.

While the sectional view of FIG. 2 also illustrates in general the configuration of the main housing 2 and the deflector 3, FIGS. 6 through 9 show in greater detail the intricacies of the deflector 3, which are a critical part of this invention.

Figures 6, 7:
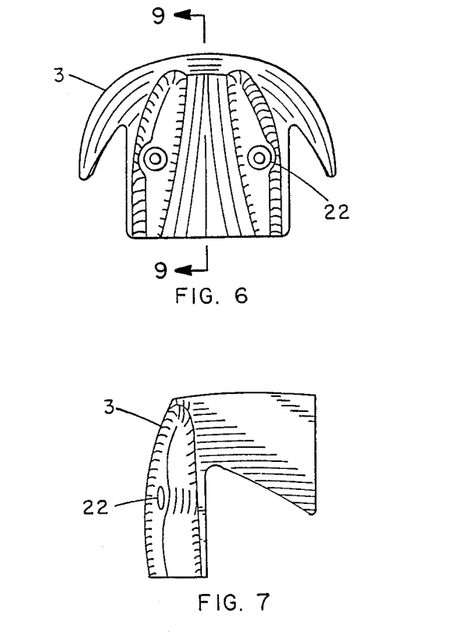
FIG. 6 is a front view of the deflector, a part of the invention.
FIG. 7 is a side view of the deflector.

FIG. 6 shows the general configuration of the deflector 3 as viewed from the front and shows mounting holes 22 which pass completely through the deflector 3 to receive screws for attaching the deflector 3 to the main housing 2 and the sound generator 7.

FIG. 7 shows the general configuration of the deflector 3 when viewed from the side.

Figures 8, 9:
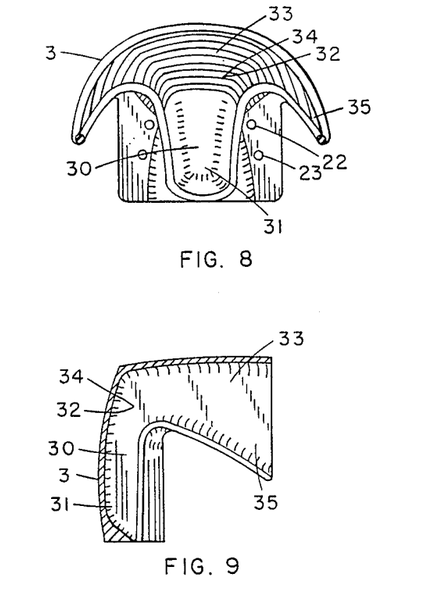
FIG. 8 is a rear view of the deflector.
FIG. 9 is a sectional view of the deflector taken substantially along line 9—9 of FIG. 6.

FIG. 8 shows the configuration of the deflector 3 as viewed from the rear and shows through holes 22 and threaded blind holes 23 which receive deflector mounting bolts.

FIG. 9 shows a cross section of the deflector 3, and FIGS. 8 and 9 also show the critical dimensional relationship which permit the efficient expansion of the sound signal from sound generator 7. These relationships are required to achieve maximum sound levels.

Use of this carefully designed deflector permits the sound signal to travel a considerable distance while being expanded at the proper rate thereby producing the highest possible sound levels from this very compact device, the outside length of which is a fraction of the length of the systems presently used. This deflector configuration is the result of a great deal of design, calculation, experimentation and testing.

FIG. 8 illustrates the relationships between the widths of the deflector chambers while FIG. 9 shows the relationships between the depths and lengths of said chambers. These relationships produce a well defined volume change within the expander chambers. As illustrated in FIG. 8 an initial expander chamber 30 has an inlet portion 31 and an outlet portion 32. It will be noted that the width of the inlet 31 is approximately ½ the width of the outlet 32. The deflector has a secondary expansion chamber 33 illustrated in FIGS. 8 and 9. This expansion chamber 33 also has an inlet portion 34 and an outlet portion 35. It will be noted that the inlet portion 34 of the secondary expansion chamber 33 and the outlet portion 32 of the initial expansion chamber 30 are one and the same. However, they have been identified separately for clarity.

Other dimensional relationships producing the outstanding results now possible in the unique design of this invention are as follows: The width of the common outlet and inlet portions 32 and 34 of the two expansion chambers 30 and 33 is approximately ⅓ the width of the outlet portion 35 of the secondary expansion chamber 33. The length (see FIG. 9) of each of the chambers 30 and 33 is approximately double the width (see FIG. 8) of the common outlet and inlet portions 32 and 34 and is also approximately ½ the width (see FIG. 8) of the outlet portion 35 of the secondary expansion chamber 33. Referring in particular to FIG. 9, the depth relationships became more obvious. It may be seen that the depth of portion 31 of the initial expansion chamber 30 is approximately equal to the depth of the outlet portion 32. Thus, the depth of the outlet and inlet portion 32, 34 of the expansion chambers 30 and 33 is approximately ½ of the depth (measured vertically in FIG. 9) of the outlet portion 35 of the secondary expansion chamber 33.

Figure 10:
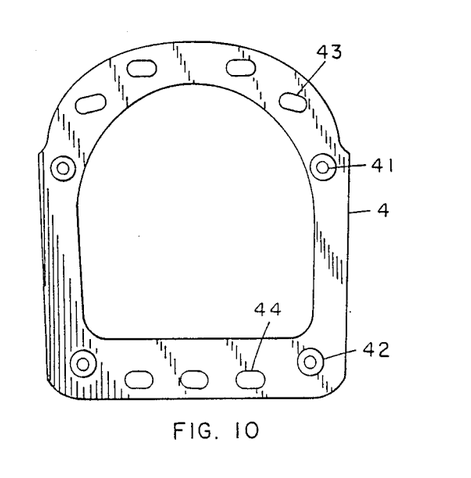
FIG. 10 is a front view of the mounting base of the present invention.
Figure 11:
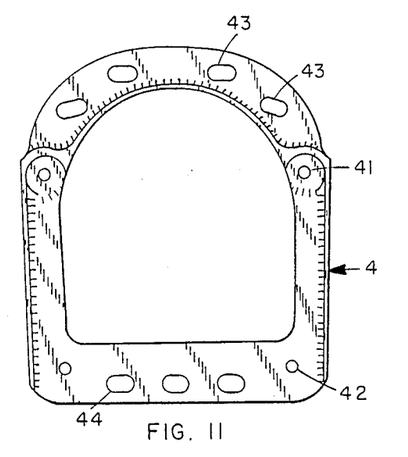
FIG. 11 is a rear view of the mounting base.

Referring now to FIGS. 10 and 11 the mounting base 4 is illustrated in a frontal view in FIG. 10 and in a rear view in FIG. 11. In FIG. 10 it will be noted that the holes 41 and 42 are designed for attachment of the mounting base to the main housing 2 of the device whereas the holes 43 and 44 are designed for mounting the system to a vehicle and are shaped in an oval configuration to allow for minor adjustments in the location of the device.

Figure 12:
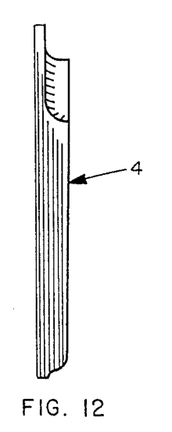
FIG. 12 is a side view of the mounting base.

The depth and configuration of the base 4 are best illustrated in FIG. 12.

Figure 13:
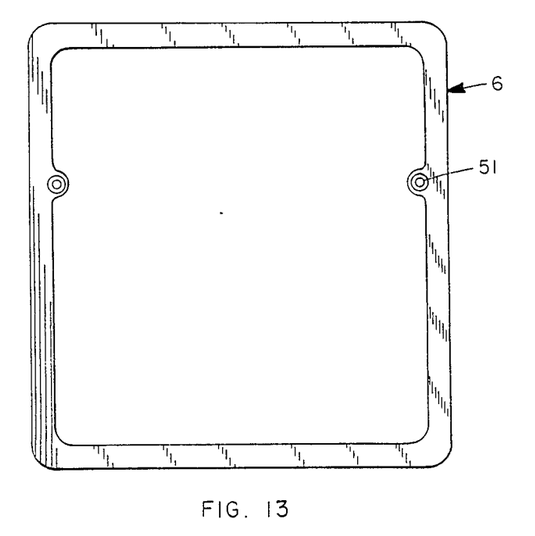
FIG. 13 is a front view of the trim ring of the present invention.
Figure 14:
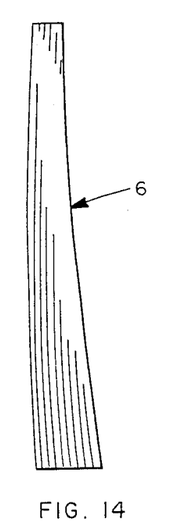
FIG. 14 is a side view of the trim ring.
Figure 15:
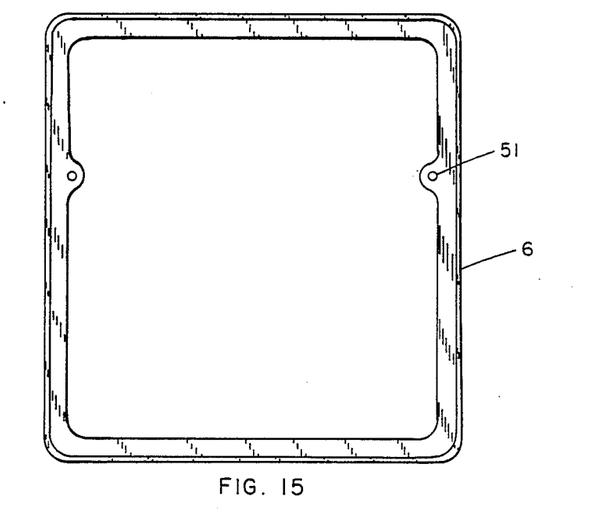
FIG. 15 is a rear view of the trim ring.

FIGS. 13, 14 and 15 show the details of trim ring 6 which surrounds the main housing 2 for concealment of the mounting base and its associated hardware. The trim ring is attached by means of conventional bolts passing through holes 51 which are located slightly above the midpoint on the vertical sides of the trim ring 6.

Figure 16:
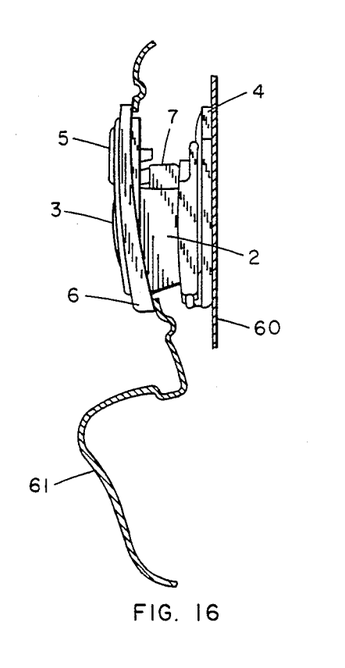
FIG. 16 is a partial sectional view of the present invention as mounted in the forward portion of a vehicle.

FIG. 16 shows the warning system mounted in the grill portion 61 of an emergency vehicle. As illustrated in this view, main housing 2 is attached to a support member 60 of the vehicle by the mounting base 4. Also illustrated is the application of trim ring 6 which serves to conceal the cut portions of the grill 61 as well as the mounting base 4 and its related hardware.

Although this invention has been described herein as a vehicle warning system, it should be understood that the system may also be used as a stationary siren warning system, such as an air raid siren, disaster warning system, volunteer fire fighters warning system, factory "whistle" system, etc.

I claim:

1. A vehicular warning system comprising:
    a main housing arranged for attachment to said vehicle, said main housing comprising an expander horn having a closed end and a generally rectangular shaped open end;
    a deflector attached to said main housing, said deflector arranged to deflect sound waves through two 90° changes of direction;
    a sound generator attached to said deflector and to said main housing;
    a mounting base for mounting said warning system on a vehicle, said mounting base being attached to said main housing; and
    a trim means for covering and concealing said mounting base and portions of said housing, said trim means being attached to said housing.

2. The vehicle warning system of claim 1 comprising a light producing means attached to said main housing, said light producing means being contained within a rectangular shaped receptacle which is an integral part of said main housing.

3. The vehicle warning system of claim 1 wherein said sound generator comprises a driver portion and an outlet nozzle.

4. The vehicle warning system of claim 3 wherein said outlet nozzle of said sound generator is mounted adjacent a long side of said rectangular shaped expander horn.

5. The vehicle warning system of claim 4 wherein said deflector is mounted within said expander horn and includes an initial expander chamber having an inlet and an outlet; and a secondary expander chamber having an inlet and an outlet and wherein said secondary expander chamber is formed at generally right angles to said initial expander and wherein the outlet of said initial expander chamber is common to the inlet of said secondary expander chamber.

6. The vehicle warning system of claim 5 wherein said inlet of the initial expander chamber of said deflector is aligned with the outlet nozzle of said sound generator so as to direct sound signals from said nozzle through said initial expander chamber, through said secondary expander chamber onto the closed end of said expandeer horn and out the open end of said expander horn.

7. The vehicle warning system of claim 6 wherein the direction of the sound signal produced by said sound generator is changed approximately ninety degrees as it passes from said nozzle through said initial expander chamber, approximately ninety degrees as it passes through said secondary expander chamber and approximately one hundred eighty degrees as it passes through said primary expander horn.

8. The vehicle warning system of claim 7 wherein the width of the inlet of said initial expansion chamber is approximately one half the width of the initial expansion chamber outlet, the length of each of said initial and secondary expansion chambers is approximately double the width of said initial expansion chamber outlet, the depth of said initial expansion chamber remains substantially the same throughout its length, the width of the inlet of said secondary expansion chamber is approximately one third the width of the outlet of said secondary expansion chamber, and wherein the depth of the inlet of said secondary expansion chamber is approximately one half the depth of the outlet of said secondary expansion chamber.

9. The vehicle warning system of claim 8 wherein the length of each of said initial and said secondary expansion chambers is approximately one half the width of the outlet of said secondary expansion chamber.

10. The vehicle warning system of claim 4 wherein said main housing has a rear side, the lower portion of which is configured as a semicircular indentation, said indentation being closed at its bottom side and open on its top side, said indentation serving as a receptacle for said driver portion of said sound generator, whereby said housing surrounds said sound generator, and said housing and said sound generator fit together to make a compact package.

11. The vehicle warning system of claim 10 wherein said semicircular indentation has a forward, closed side which has a second indentation near the top of said forward side for accommodating said outlet nozzle of said sound generator.

12. The vehicle warning system of claim 11 wherein said second indentation has a hole in its forward end for passing sound from said outlet nozzle of said sound generator.

13. The vehicle warning system of claim 12 wherein said expander horn has a rear wall which is a common wall with said semicircular indentation, whereby said expander horn encloses said sound generator and its said outlet nozzle.

14. The vehicle warning system of claim 12 wherein said deflector is attached to the outer, forward wall of said semicircular indentation and said deflector is configured so that it can receive sound signals from said outlet nozzle of said sound generator through said hole in said second indentation and divert said sound signals downward and backward against the closed end of said expander horn, whereby said sound signals are forced by the configuration of said expander horn to reverse direction about 180° and exit from said expander horn in a forward direction.

15. The vehicle warning system of claim 14 comprising a light producing means attached to a frame, said frame being an integral part of said main housing.

16. The vehicle warning system of claim 1 wherein said trim means is generally rectangular shaped and is adapted to closely surround the outer portion of said main housing.

17. The vehicle warning system of claim 1 wherein said mounting base is adapted for attachment to said main housing and to a vehicle, and wherein said mounting base is accessible for attachment to a vehicle from the side of the mounting base to which the main housing attaches when the mounting base and main housing are attached to one another.

18. A compact vehicle warning system comprising:

a main housing arranged for attachment to said vehicle, said main housing comprising:

a rectangular expander horn formed in the front side of said main housing as an integral part of said main housing, said expander horn having a closed rear portion and an open front portion; and a first receptacle for said driver portion of said sound generator formed in the rear side of said main housing as an integral part of said main housing, said first receptacle and said expander horn having a common wall, so that said first receptacle for said sound generator forms a first projection in the top portion of said expander horn;

a sound deflector attached to said main housing; and a sound generator attached to said deflector and to said main housing; said sound generator comprising a driver portion.

19. The compact vehicle warning system of claim 18 wherein said sound generator comprises an outlet nozzle attached to the forward end of said driver portion of said sound generator and said main housing comprises a second smaller receptacle for said sound generator in the forward end of said first receptacle for said sound generator, said second receptacle also being formed in the rear wall of said main housing as an integral part of said main housing, said second receptacle and said expander horn having a common wall, so that said second receptacle forms a second projection in the top portion of said expander horn, said second projection being an extension of said first projection.

20. The compact vehicle warning system of claim 19 wherein said second receptacle has a hole in the wall of said main housing, opposite said outlet nozzle, for allowing sound signals from said sound generator to be transmitted forward.

21. The compact vehicle warning system of claim 20 wherein said deflector is attached to the wall of said first projection for receiving sound signals from said sound generator and diverting said sound signals downward and backward toward said closed rear portion of said expander horn, whereby the configuration of said expander horn forces said sound signals to reverse direction approximately 180° and exit said expander horn in a forward direction.

* * * * *